United States Patent
Koga et al.

(10) Patent No.: US 7,351,676 B2
(45) Date of Patent: Apr. 1, 2008

(54) DIELECTRIC PORCELAIN COMPOSITION, MULTILAYER CERAMIC CAPACITOR, AND ELECTRONIC COMPONENT

(75) Inventors: Akihiro Koga, Kyoto (JP); Yukio Tominaga, Yukuhasi (JP); Tetsuhiro Takahashi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 10/568,157

(22) PCT Filed: Aug. 11, 2004

(86) PCT No.: PCT/JP2004/001150

§ 371 (c)(1),
(2), (4) Date: Feb. 13, 2006

(87) PCT Pub. No.: WO2005/016845

PCT Pub. Date: Feb. 24, 2005

(65) Prior Publication Data

US 2006/0240973 A1 Oct. 26, 2006

(30) Foreign Application Priority Data

Aug. 14, 2003 (JP) ............................. 2003-293474

(51) Int. Cl.
*C04B 35/46* (2006.01)
(52) U.S. Cl. .................. 501/137; 501/138; 501/139; 361/311; 361/321.2; 361/321.4; 361/321.5
(58) Field of Classification Search ........ 361/303–305, 361/311, 321.2, 321.4, 321.5; 428/210; 501/137–139
See application file for complete search history.

(56) References Cited

U.S. PATENT DOCUMENTS

| | | | |
|---|---|---|---|
| 5,225,960 A | 7/1993 | Kishi et al. | |
| 5,335,139 A | 8/1994 | Nomura et al. | |
| 5,668,694 A | 9/1997 | Sato et al. | |
| 5,731,950 A | 3/1998 | Sakamoto et al. | |
| 5,742,473 A | 4/1998 | Sano et al. | |
| 6,143,109 A * | 11/2000 | Sano et al. | 156/89.16 |
| 6,346,497 B1 | 2/2002 | Nakamura et al. | |
| 6,542,067 B1 * | 4/2003 | Kawamoto | 338/22 R |
| 6,620,753 B2 * | 9/2003 | Nakamura et al. | 501/137 |
| 6,620,754 B2 * | 9/2003 | Mizuno et al. | 501/138 |
| 7,158,364 B2 * | 1/2007 | Miyauchi et al. | 361/303 |
| 2002/0016247 A1 | 2/2002 | Mizuno et al. | |
| 2002/0072464 A1 | 6/2002 | Nakamura et al. | |

FOREIGN PATENT DOCUMENTS

CN    1156318    8/1997

(Continued)

*Primary Examiner*—Cathy F. Lam
(74) *Attorney, Agent, or Firm*—Hamre, Schumann, Mueller & Larson, P.C.

(57) ABSTRACT

A dielectric ceramic composition of the present invention includes 100 parts by mole of $BaTiO_3$, $x_1$ parts by mole of MnO, $x_2$ parts by mole of $Cr_2O_3$, $x_3$ parts by mole of $Y_2O_3$ and/or $Ho_2O_3$, $x_4$ parts by mole of oxide selected from the group consisting of BaO, CaO and SrO, and $x_5$ parts by mole of $SiO_2$ and/or $GeO_2$, where $0.5 \leq x_1 \leq 4.5$, $0.05 \leq x_2 \leq 1.0$, $x_1+x_2 \leq 4.55$, $0.25 \leq x_3 \leq 1.5$, $0.5 \leq x_4 \leq 6$ and $0.5 \leq x_5 \leq 6$. A multilayer ceramic capacitor of the present invention includes a laminated structure of a ceramic dielectric made of such a composition and an electrode made of Ni or Ni alloy.

6 Claims, 5 Drawing Sheets

FOREIGN PATENT DOCUMENTS

| | | |
|---|---|---|
| JP | 55-67567 | 5/1980 |
| JP | 61-36170 | 2/1986 |
| JP | 6-5460 | 1/1994 |
| JP | 6-342735 | 12/1994 |
| JP | 8-124785 | 5/1996 |
| JP | 9-171937 | 6/1997 |
| JP | 2000-103668 | 4/2000 |
| JP | 2002-20166 | 1/2002 |
| JP | 2002-201065 | 7/2002 |

\* cited by examiner

F I G. 2

| | MnO | $Cr_2O_3$ | MnO+$Cr_2O_3$ | $Y_2O_3$ | $Ho_2O_3$ | BaO | CaO | SrO | $SiO_2$ | $Ge_2O_3$ | $V_2O_5$ | $Al_2O_3$ | $B_2O_3$ |
|---|---|---|---|---|---|---|---|---|---|---|---|---|---|
| Ex. 1 | 0.500 | 0.600 | 1.100 | 0.625 | – | 2.000 | – | – | 2.000 | – | 0.025 | 0.500 | – |
| Ex. 2 | 1.000 | 0.600 | 1.600 | 0.625 | – | 2.000 | – | – | 2.000 | – | 0.025 | 0.500 | – |
| Ex. 3 | 2.000 | 0.600 | 2.600 | 0.625 | – | 2.000 | – | – | 2.000 | – | 0.025 | 0.500 | – |
| Ex. 4 | 3.900 | 0.600 | 4.500 | 0.625 | – | 2.000 | – | – | 2.000 | – | 0.025 | 0.500 | – |
| Ex. 5 | 1.000 | 0.050 | 1.025 | 0.625 | – | 2.000 | – | – | 2.000 | – | 0.025 | 0.500 | – |
| Ex. 6 | 1.000 | 0.450 | 1.000 | 0.625 | – | 2.000 | – | – | 2.000 | – | 0.025 | 0.500 | – |
| Ex. 7 | 1.000 | 1.000 | 2.000 | 0.625 | – | 2.000 | – | – | 2.000 | – | 0.025 | 0.500 | – |
| Ex. 8 | 1.000 | 0.600 | 1.600 | 0.250 | – | 2.000 | – | – | 2.000 | – | 0.025 | 0.500 | – |
| Ex. 9 | 1.000 | 0.600 | 1.600 | 0.625 | – | 2.000 | – | – | 2.000 | – | 0.025 | 0.500 | – |
| Ex. 10 | 1.000 | 0.600 | 1.600 | 1.500 | – | 2.000 | – | – | 2.000 | – | 0.025 | 0.500 | – |
| Ex. 11 | 1.000 | 0.600 | 1.600 | 0.500 | 0.125 | 2.000 | – | – | 2.000 | – | 0.025 | 0.500 | – |
| Ex. 12 | 1.000 | 0.600 | 1.600 | 0.125 | 0.500 | 2.000 | – | – | 2.000 | – | 0.025 | 0.500 | – |
| Ex. 13 | 1.000 | 0.600 | 1.600 | – | 0.625 | 2.000 | – | – | 2.000 | – | 0.025 | 0.500 | – |
| Ex. 14 | 1.000 | 0.600 | 1.600 | 0.625 | – | 0.500 | – | – | 0.500 | – | 0.025 | 0.500 | – |
| Ex. 15 | 1.000 | 0.600 | 1.600 | 0.625 | – | 1.000 | – | – | 1.000 | – | 0.025 | 0.500 | – |
| Ex. 16 | 1.000 | 0.600 | 1.600 | 0.625 | – | 2.500 | – | – | 2.500 | – | 0.025 | 0.500 | – |
| Ex. 17 | 1.000 | 0.600 | 1.600 | 0.625 | – | 6.000 | – | – | 6.000 | – | 0.025 | 0.500 | – |
| Ex. 18 | 1.000 | 0.600 | 1.600 | 0.625 | – | – | 2.000 | – | 2.000 | – | 0.025 | 0.500 | – |
| Ex. 19 | 1.000 | 0.600 | 1.600 | 0.625 | – | – | – | 2.000 | – | 2.000 | 0.025 | 0.500 | – |
| Ex. 20 | 1.000 | 0.600 | 1.600 | 0.625 | – | 1.000 | 1.000 | – | – | 2.000 | 0.025 | 0.500 | – |
| Ex. 21 | 1.000 | 0.600 | 1.600 | 0.625 | – | 1.000 | – | 1.000 | 2.000 | – | 0.025 | 0.500 | – |

FIG. 3

| | MnO | $Cr_2O_3$ | $MnO+Cr_2O_3$ | $Y_2O_3$ | $Ho_2O_3$ | BaO | CaO | SrO | $SiO_2$ | $Ge_2O_3$ | $V_2O_5$ | $Al_2O_3$ | $B_2O_3$ |
|---|---|---|---|---|---|---|---|---|---|---|---|---|---|
| Ex. 22 | 1.000 | 0.600 | 1.600 | 0.625 | — | — | 1.000 | 1.000 | 1.000 | 1.000 | 0.025 | 0.500 | — |
| Ex. 23 | 1.000 | 0.600 | 1.600 | 0.625 | — | 2.000 | 1.000 | 0.500 | 1.500 | 1.000 | 0.025 | 0.500 | — |
| Ex. 24 | 1.000 | 0.600 | 1.600 | 0.625 | — | 2.000 | — | — | 2.000 | — | 0.025 | 0.500 | — |
| Ex. 25 | 1.000 | 0.600 | 1.600 | 0.625 | — | 2.000 | — | — | 2.000 | — | 0.010 | 0.500 | — |
| Ex. 26 | 1.000 | 0.600 | 1.600 | 0.625 | — | 2.000 | — | — | 2.000 | — | 0.500 | 0.500 | — |
| Ex. 27 | 1.000 | 0.600 | 1.600 | 0.625 | — | 2.000 | — | — | 2.000 | — | 1.000 | 0.200 | — |
| Ex. 28 | 1.000 | 0.600 | 1.600 | 0.625 | — | 2.000 | — | — | 2.000 | — | 0.025 | 0.750 | — |
| Ex. 29 | 1.000 | 0.600 | 1.600 | 0.625 | — | 2.000 | — | — | 2.000 | — | 0.025 | 1.000 | — |
| Ex. 30 | 1.000 | 0.600 | 1.600 | 0.625 | — | 2.000 | — | — | 2.000 | — | 0.025 | — | 0.200 |
| Ex. 31 | 1.000 | 0.600 | 1.600 | 0.625 | — | 2.000 | — | — | 2.000 | — | 0.025 | — | 1.000 |
| Ex. 32 | 1.000 | 0.600 | 1.600 | 0.625 | — | 2.000 | — | — | 2.000 | — | 0.025 | 0.250 | 0.250 |
| Ex. 33 | 1.000 | 0.600 | 1.600 | 0.625 | — | 2.000 | — | — | 2.000 | — | 0.025 | 0.500 | 0.500 |
| Comp. 1 | 0.400 | 0.600 | 1.000 | 0.625 | — | 2.000 | — | — | 2.000 | — | 0.025 | 0.500 | — |
| Comp. 2 | 5.400 | 0.600 | 6.000 | 0.625 | — | 2.000 | — | — | 2.000 | — | 0.025 | 0.500 | — |
| Comp. 3 | 1.000 | 0.025 | 1.600 | 0.625 | — | 2.000 | — | — | 2.000 | — | 0.025 | 0.500 | — |
| Comp. 4 | 1.000 | 1.250 | 2.250 | 0.625 | — | 2.000 | — | — | 2.000 | — | 0.025 | 0.500 | — |
| Comp. 5 | 1.000 | 0.600 | 2.250 | 0.005 | — | 2.000 | — | — | 2.000 | — | 0.025 | 0.500 | — |
| Comp. 6 | 1.000 | 0.600 | 1.600 | 1.750 | — | 2.000 | — | — | 2.000 | — | 0.025 | 0.500 | — |
| Comp. 7 | 1.000 | 0.600 | 1.600 | 0.625 | — | 0.250 | — | — | 0.250 | — | 0.025 | 0.500 | — |
| Comp. 8 | 1.000 | 0.600 | 1.600 | 0.625 | — | 7.000 | — | — | 7.000 | — | 0.025 | 0.500 | — |

F I G. 4

| | Sintering (°C) | Dielectric Constant | Dielectric Loss tan δ | CR (Ω·F) | Dielectric Strength (V/μm) | Temperature Dependence EIA-X7R | Temperature Dependence JIS-B | DC-Bias (%) | IR ACCELERATED LIFE (Hour) |
|---|---|---|---|---|---|---|---|---|---|
| Ex. 1 | 1350 | 3256 | 3.2 | 2100 | 80 | ○ | ○ | −23 | 2.3 |
| Ex. 2 | 1300 | 3432 | 3.4 | 2450 | 95 | ○ | ○ | −24 | 3.3 |
| Ex. 3 | 1300 | 3210 | 3.2 | 2300 | 90 | ○ | ○ | −23 | 2.1 |
| Ex. 4 | 1300 | 3020 | 3.0 | 2050 | 85 | ○ | ○ | −20 | 2.0 |
| Ex. 5 | 1300 | 3781 | 3.8 | 2350 | 85 | ○ | ○ | −28 | 2.5 |
| Ex. 6 | 1300 | 3800 | 3.8 | 2430 | 95 | ○ | ○ | −29 | 3.2 |
| Ex. 7 | 1300 | 3525 | 3.5 | 2210 | 95 | ○ | ○ | −25 | 2.4 |
| Ex. 8 | 1300 | 3690 | 3.7 | 2200 | 85 | ○ | ○ | −27 | 2.8 |
| Ex. 9 | 1300 | 3500 | 3.5 | 2500 | 100 | ○ | ○ | −25 | 3.5 |
| Ex. 10 | 1350 | 3310 | 3.3 | 2340 | 95 | ○ | ○ | −24 | 3.2 |
| Ex. 11 | 1300 | 3400 | 3.4 | 2650 | 95 | ○ | ○ | −24 | 3.3 |
| Ex. 12 | 1300 | 3431 | 3.4 | 2600 | 90 | ○ | ○ | −25 | 3.2 |
| Ex. 13 | 1300 | 3422 | 3.5 | 2625 | 100 | ○ | ○ | −25 | 3.4 |
| Ex. 14 | 1350 | 3642 | 3.7 | 2250 | 85 | ○ | ○ | −30 | 3.4 |
| Ex. 15 | 1300 | 3571 | 3.6 | 2350 | 90 | ○ | ○ | −27 | 3.3 |
| Ex. 16 | 1250 | 3350 | 3.3 | 2400 | 85 | ○ | ○ | −24 | 2.4 |
| Ex. 17 | 1250 | 3020 | 2.9 | 2450 | 80 | ○ | ○ | −22 | 1.5 |
| Ex. 18 | 1250 | 3420 | 3.4 | 2500 | 95 | ○ | ○ | −24 | 3.4 |
| Ex. 19 | 1250 | 3485 | 3.4 | 2400 | 100 | ○ | ○ | −24 | 3.0 |
| Ex. 20 | 1250 | 3466 | 3.4 | 2550 | 95 | ○ | ○ | −24 | 3.2 |
| Ex. 21 | 1250 | 3431 | 3.4 | 2450 | 95 | ○ | ○ | −24 | 3.3 |

F I G. 5

| | Sintering (°C) | Dielectric Constant | Dielectric Loss tan δ | CR (Ω·F) | Dielectric Strength (V/μm) | Temperature Dependence | | DC-Bias (%) | IR ACCELERATED LIFE (Hour) |
|---|---|---|---|---|---|---|---|---|---|
| | | | | | | EIA-X7R | JIS-B | | |
| Ex. 22 | 1250 | 3471 | 3.4 | 3520 | 95 | ○ | ○ | −24 | 3.4 |
| Ex. 23 | 1200 | 3355 | 3.3 | 2460 | 90 | ○ | ○ | −24 | 2.7 |
| Ex. 24 | 1300 | 3510 | 3.5 | 2670 | 90 | ○ | ○ | −25 | 3.2 |
| Ex. 25 | 1350 | 3311 | 3.3 | 2210 | 85 | ○ | ○ | −23 | 3.4 |
| Ex. 26 | 1350 | 3250 | 3.2 | 2060 | 90 | ○ | ○ | −23 | 3.0 |
| Ex. 27 | 1300 | 3313 | 2.8 | 2400 | 90 | ○ | ○ | −23 | 3.1 |
| Ex. 28 | 1300 | 3650 | 3.3 | 2450 | 90 | ○ | ○ | −27 | 2.5 |
| Ex. 29 | 1250 | 3850 | 3.7 | 2300 | 85 | ○ | ○ | −30 | 1.8 |
| Ex. 30 | 1250 | 3673 | 4.3 | 2450 | 85 | ○ | ○ | −26 | 2.8 |
| Ex. 31 | 1150 | 3514 | 3.7 | 2350 | 95 | ○ | ○ | −25 | 2.1 |
| Ex. 32 | 1200 | 3488 | 3.5 | 2360 | 90 | ○ | ○ | −25 | 2.5 |
| Ex. 33 | 1150 | 3615 | 3.7 | 2410 | 90 | ○ | ○ | −27 | 2.0 |
| Comp. 1 | 1350 | 3104 | 3.0 | 1800 | 70 | ○ | ○ | −22 | 1.5 |
| Comp. 2 | >1350 | — | — | — | — | — | — | — | — |
| Comp. 3 | 1350 | 3652 | 3.6 | 2300 | 80 | × | × | −28 | 2.4 |
| Comp. 4 | >1350 | — | — | — | — | — | — | — | — |
| Comp. 5 | 1300 | 4050 | 4.2 | 1850 | 75 | × | × | −33 | 0.9 |
| Comp. 6 | >1350 | — | — | — | — | — | — | — | — |
| Comp. 7 | >1350 | — | — | — | — | — | — | — | — |
| Comp. 8 | 1250 | 2650 | 2.5 | 2550 | 80 | ○ | × | −20 | 0.6 |

DIELECTRIC PORCELAIN COMPOSITION, MULTILAYER CERAMIC CAPACITOR, AND ELECTRONIC COMPONENT

TECHNICAL FIELD

The present invention relates to a dielectric ceramic composition which is usable as a dielectric material of a capacitor. The invention also relates to a multilayer ceramic capacitor, and an electronic component including a portion made of such a dielectric material.

BACKGROUND ART

A multilayer ceramic capacitor which utilizes, as the dielectric material between electrodes, a ceramic composition containing titanate such as barium titanate as the main component is one of essential parts for recent electronic devices for industrial or consumer use, because such a capacitor can have a small size and a large capacitance, excellent electric characteristics for a wide frequency band and good heat resistance, and can be easily mass-produced.

To manufacture such a multilayer ceramic capacitor, an organic binder, a plasticizer, a solvent and a dispersant, for example, are added and mixed with the $BaTiO_3$-based material powder of a ceramic composition to prepare slurry. Subsequently, by a doctor blade method, for example, a green sheet of the dielectric ceramic composition is prepared from the slurry. Then, conductive paste including metal powder for forming an inner electrode is printed on the green sheet. A plurality of green sheets formed in this way and each having conductive paste printed on the obverse surface are so laminated that the conductive paste and the green sheet are alternately positioned and bonded under pressure. Subsequently, the laminated product is baked at a predetermined baking temperature to be integral (baking step). In the baking step, the ceramic composition in each green sheet sinters to form a ceramic dielectric layer, and metal powder in the conductive paste sinters to form inner electrodes. Thereafter, a pair of outer electrodes, each of which is electrically connected to a predetermined group of inner electrodes, are formed on surfaces of the laminated product.

In the above-described baking process, for the $BaTiO_3$-based ceramic composition to properly sinter and exhibit good dielectric characteristics in the multilayer ceramic capacitor, the ceramic composition needs to be baked at high temperatures of about 1150-1350° C. On the other hand, as the metal for forming the inner electrodes, a metal material needs to be used which has a melting point that is higher than the baking temperature of the baking process, which can be baked at the same baking temperature as the ceramic composition, and which is not substantially oxidized at the high temperature in the baking process. As the metal materials that satisfy such conditions, Pd, Pt or alloys thereof are known. However, these metal materials are expensive, and hence, are not preferable. When such metal materials are used as the inner electrode material, the cost for the electrode material unfavorably increases as a larger number of layers are stacked to increase the capacitance of the multilayer ceramic capacitor.

Therefore, as the inner electrode material, the use of Ni and Ni alloys have been considered that are relatively inexpensive, have a low specific resistance and a melting point higher than the sintering temperature of the $BaTiO_3$-based ceramic composition, and can be baked at the same temperature as the ceramic composition. However, in the baking at high temperatures in an atmosphere containing oxygen, i.e., in the air, for example, Ni isoxidized and the function as the electrode maybe lost. Further, nickel oxide maybe taken into the ceramic composition to deteriorate the properties of the capacitor.

When the baking step is performed in a reducing atmosphere or a low-oxygen atmosphere to prevent the oxidation of Ni, the $BaTiO_3$-based ceramic composition is reduced to change the valence of Ti from 4 to 3. As a result, the composition becomes a semiconductor, and the insulating property is deteriorated. Further, the baking step in a reducing atmosphere or a low-oxygen atmosphere increases the oxygen vacancy in the $BaTiO_3$-based ceramic composition, so that the life of the ceramic composition (time before insulation deterioration occurs) tends to be shortened.

Therefore, as a reduction-resistant $BaTiO_3$-based ceramic composition in which properties deterioration such as a decrease in insulation resistance is less likely to occur even in the baking in a reducing atmosphere, a composition in which the molar ratio of $BaO/TiO_2$ is no less than 1 or a composition in which part of Ba is replaced by Ca have been developed. Such ceramic compositions are disclosed in JP-A-S55-67567, for example.

On the other hand, due to the development of electronic devices having a small size, multifunction and high performance, a small size and a large capacitance are demanded for a capacitor which constitutes an electric circuit to be incorporated in such electronic devices. To satisfy the demand, in addition to the improvement of the dielectric material, the thickness of the dielectric layer between electrodes tends to be reduced to enable the lamination of a larger number of layers. However, to properly reduce the thickness of the dielectric layer, the ceramic composition constituting the dielectric layer needs to have a sufficient insulation resistance, and the deterioration with time of the ceramic composition needs to be sufficiently small. Further, in accordance with the size reduction, increase of functions and improvement of performance of an electronic device, its electric circuit has high density and is likely to be heated up during the use of the device. Therefore, for the ceramic composition constituting the dielectric layer of a capacitor in the electric circuit, it is demanded more strongly than before that the properties of the composition do not change largely due to the temperature change.

Such enhancement of properties and reliability is also demanded with respect to the reduction-resistant $BaTiO_3$-based ceramic composition, and the enhancement of properties and reliability by adding various oxides have been studied. For example, such ceramic composition is disclosed in the Patent Documents 1-5 described below.

However, in prior art $BaTiO_3$-based ceramic composition, it is difficult to satisfactorily enhance the insulation resistance, suppress the deterioration with time of the insulation resistance and suppress the capacitance change relative to temperature change while ensuring sufficient reduction-resistance. Therefore, with the prior art technique, it is difficult to enhance the properties of a multilayer ceramic capacitor utilizing Ni or Ni alloy as the inner electrode material to a level equal to or higher than that of a multilayer ceramic capacitor having Pd inner electrodes.

Patent Document 1: JP-A-S61-36170
Patent Document 2: JP-A-H06-5460
Patent Document 3: JP-A-H06-342735
Patent Document 4: JP-A-H08-124785
Patent Document 5: JP-A-H09-171937

DISCLOSURE OF THE INVENTION

The present invention is conceived under the circumstances described above. It is, therefore, an object of the present invention to provide a dielectric ceramic composition which has a high insulation resistance even after the baking in a reducing atmosphere, whose deterioration of the insulation resistance (IR) with time is small (i.e., the IR accelerated life is long), whose capacitance change relative to temperature change is small and which is resistant to reduction, to provide a multilayer ceramic capacitor utilizing the composition as the material for the dielectric layer between electrodes, and to provide an electronic component including a portion made of the composition.

According to a first aspect of the present invention, a dielectric ceramic composition is provided. The dielectric ceramic composition comprises 100 parts by mole of $BaTiO_3$, $x_1$ parts by mole of MnO, $x_2$ parts by mole of $Cr_2O_3$, $x_3$ parts by mole of $Y_2O_3$ and/or $Ho_2O_3$, $x_4$ parts by mole of oxide selected from the group consisting of BaO, CaO and SrO, and $x_5$ parts by mole of $SiO_2$ and/or $GeO_2$, where $0.5 \leq x_1 \leq 4.5$, $0.05 \leq x_2 \leq 1.0$, $x_1 + x_2 \leq 4.55$, $0.25 \leq x_3 \leq 1.5$, $0.5 \leq x_4 \leq 6$ and $0.5 \leq x_5 \leq 6$.

Preferably, the dielectric ceramic composition according to the first aspect of the present invention further comprises 0.01 to 1.0 part by mole of $V_2O_5$. Preferably, the dielectric ceramic composition according to the first aspect of the present invention further comprises 0.2 to 1.0 part by mole of $Al_2O_3$ and/or $B_2O_3$.

According to a second aspect of the present invention, a multilayer ceramic capacitor comprising a laminated structure of a ceramic dielectric and an electrode is provided. In the capacitor, the ceramic dielectric is made of a dielectric ceramic composition having any one of the structures described above as the first aspect of the present invention. The electrode is made of Ni or an alloy containing Ni.

According to a third aspect of the present invention, an electronic component is provided. The electronic component includes a portion made of the dielectric ceramic composition having any one of the structures described above as the first aspect of the present invention.

To solve the problems described before, the inventors of the present invention have performed various studies about the $BaTiO_3$-based dielectric ceramic composition to enhance the properties. Specifically, the inventors repeated the operations of adding different kinds of oxides to $BaTiO_3$ as the base material, baking the ceramic composition, and examining the properties to know how close the properties of the composition were to the intended properties. Although the action of the components to be added have been known to some degree through experiences, and the reasons therefor have been explained in various ways, the properties cannot be confirmed without actually preparing the product (ceramic composition or an electronic component utilizing the composition) and examining the characteristics.

Therefore, on the condition that the ceramic composition can be sintered into a dense compact at temperatures up to 1350° C. in a reducing atmosphere and has a dielectric constant of 3000 or more at 1 kHz, the influences of the included components were examined, and compositions which can exceed the predetermined target values of the insulation resistance, the dielectric strength, the IR accelerated life and the temperature dependence of capacitance (capacitance change relative to temperature change) were selected.

According to the study of the effect of adding MnO which is a component to enhance the resistance to reduction, a higher content of MnO in the ceramic composition provides a higher resistance to reduction in the ceramic composition but also provides a larger capacitance change relative to the temperature change. When MgO, for example, is added to the ceramic composition to decrease the temperature dependence, disadvantages such as a decrease in relative dielectric constant and a rise of the baking temperature necessary for proper sintering may be caused. When a sintering assistant such as $LiO_2$ or $B_2O_3$ is added, the baking temperature can be lowered. In such a case, however, grain growth occurs during the baking, and the capacitance change relative to the temperature change increases. In this way, the addition of a certain kind of component by a certain amount to improve a certain property often results in the deterioration of another property.

These studies have revealed that, in adding MnO and increasing the amount to enhance the resistance to reduction, the simultaneous addition of an appropriate amount of $Cr_2O_3$ can reduce the temperature dependence of capacitance. Although the reason why the addition of MnO and $Cr_2O_3$ in combination provides such an effect is not clear, this method can eliminate the need for adding MgO, which is generally used to reduce the temperature dependence. Since the addition of MgO raises the temperature necessary for sintering, the amount of a sintering assistant, which tends to reduce the dielectric constant and the insulation resistance, need be increased to lower the sintering temperature. However, it is found that, by controlling the total amount of MnO and $Cr_2O_3$, the capacitance change relative to the temperature change and the rise of the sintering temperature can be suppressed without the need for increasing the amount of the sintering assistant.

Therefore, the composition consisting of $BaTiO_3$ to which MnO and $Cr_2O_3$ were added was determined as the base composition, and addition of other components was studied to further enhance various properties. As a result, it was confirmed that the addition of rare earth elements such as $Y_2O_3$ and $Ho_2O_3$ enhanced the IR accelerated life (reliability).

However, the addition of oxides of the rare earth elements tends to raise the baking temperature necessary for providing a dense sintered body. Therefore, study was performed to find a sintering assistant which can lower the baking temperature without largely influencing other properties, and the addition Of $MO_2$ ("M" represents Si or Ge) in combination with AO ("A" represents Ba, Ca or Sr) was found to be preferable. The combined use of at least one of BaO, CaO and SrO and at least one of $SiO_2$ and $GeO_2$ had sufficient effect of lowering the baking temperature and enhancing the density of the sintered body. These substances form glass at grain boundaries and have the effect of lowering the sintering temperature efficiently even when used by a small amount.

Further, it was found that the content of $V_2O_5$ by a small amount could prolong the IR accelerated life and lower the sintering temperature, so that it is preferable to add $V_2O_5$ as required. Further, at least one of $Al_2O_3$ and $B_2O_3$ may be added, because these substances are effective for lowering the sintering temperature and improving the temperature characteristics.

By using the dielectric ceramic composition obtained in this way and having a high insulation resistance, high dielectric strength and a long IR accelerated life, a multilayer ceramic chip capacitor was prepared by forming Ni inner electrodes and baking simultaneously in a reducing atmosphere. The properties as a dielectric was examined and found to be excellent.

Since the intended properties were achieved in this way, the appropriate addition amount of each component was studied specifically, whereby the present invention having the structures as described as the first through the third aspects was completed.

BRIEF DESCRIPTION OF THE DRAWINGS

FIG. 2 is a table showing the compositions (except for $BaTiO_3$) of dielectric ceramic compositions of inventive examples 1-21 for forming the dielectric layer of a multilayer ceramic capacitor.

FIG. 3 is a table showing the compositions (except for $BaTiO_3$) of dielectric ceramic compositions of inventive examples 22-33 and comparative examples 1-8 for forming the dielectric layer of a multilayer ceramic capacitor.

FIG. 4 is a table showing the results of the properties test carried out with respect to the multilayer ceramic capacitors of inventive examples 1-21.

FIG. 5 is a table showing the results of the properties test carried out with respect to the multilayer ceramic capacitors of inventive examples 22-33 and comparative examples 1-8.

BEST MODE FOR CARRYING OUT THE INVENTION

Figure 1:
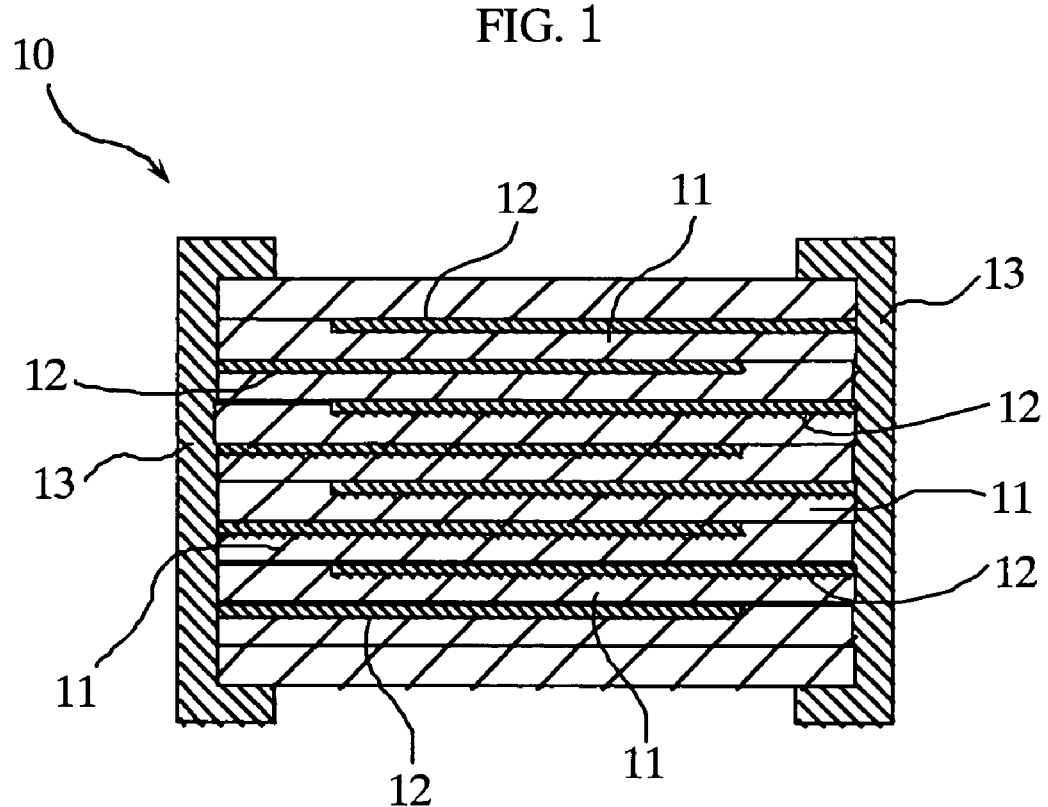
FIG. 1 is a sectional view showing a multilayer ceramic capacitor.

FIG. 1 is a sectional view showing a multilayer ceramic capacitor 10 as an example of electronic component manufactured by using a dielectric ceramic composition according to the present invention. The multilayer ceramic capacitor 10 includes dielectric layers 11, a plurality of inner electrodes 12, and a pair of outer electrodes 13. The dielectric layers 11 are made of the ceramic composition of the present invention, and each of the dielectric layers is arranged to partially intervene between the inner electrodes 12. A predetermined set of inner electrodes 12 are electrically connected to one of the outer electrodes 13, whereas another set of inner electrodes 12 are electrically connected to the other outer electrode 13. The inner electrodes 12 are made of Ni or Ni alloy, whereas the external electrodes 13 are made of Cu or Cu alloy.

The dielectric ceramic composition of the present invention contains $BaTiO_3$, MnO and $Cr_2O_3$. The composition further contains $Y_2O_3$ and/or $Ho_2O_3$. The composition further contains an oxide selected from the group consisting of BaO, CaO and SrO and further contains $SiO_2$ and/or $GeO_2$.

MnO is contained to enhance the reduction resistance of the dielectric ceramic composition (i.e., to suppress the decrease of the insulation resistance of the dielectric ceramic composition due to the baking in a reducing atmosphere). When the content of MnO relative to 100 parts by mole of $BaTiO_3$ is expressed as $x_1$, $x_1$ is in the range of $0.5 \leq x_1 \leq 4.5$. When $x_1$ is lower than 0.5, the decrease of the insulation resistance may not be prevented satisfactorily. When $x_1$ exceeds 4.5, the change of capacitance relative to the temperature change (temperature dependence of capacitance) tends to become large.

$Cr_2O_3$ is contained to enhance the reduction resistance and to reduce the temperature dependence of capacitance in the coexistence of MnO. When the content of $Cr_2O_3$ relative to 100 parts by mole of $BaTiO_3$ is expressed as $x_2$, $x_2$ is in the range of $0.05 \leq x_2 \leq 1.0$. When $x_2$ is lower than 0.05, the effects of the enhancement of the reduction resistance and the suppression of the temperature dependence cannot be obtained sufficiently. When $x_2$ exceeds 1.0, the temperature necessary for sintering the dielectric ceramic composition becomes high, and the dielectric ceramic composition may not properly sinter at temperatures below the melting point of Ni.

When the total content of MnO and $Cr_2O_3$ is excessive, the temperature dependence of capacitance becomes undesirably large. Therefore, $x_1+x_2$ needs to be no more than 4.55.

$Y_2O_3$ and/or $Ho_2O_3$ is contained to prolong the IR accelerated life. When the total content of $Y_2O_3$ and/or $Ho_2O_3$ relative to 100 parts by mole of $BaTiO_3$ is expressed as $x_3$, $x_3$ is in the range of $0.25 \leq x_3 \leq 1.5$. When $x_3$ is lower than 0.25, the life cannot be prolonged sufficiently. When $x_3$ exceeds 1.5, the baking temperature necessary for obtaining a dense sintered body becomes undesirably high.

When an oxide (AO) selected from the group consisting of BaO, CaO and SrO and an oxide ($MO_2$) selected from the group consisting of $SiO_2$ and $GeO_2$ are contained in combination, the effects of a sintering assistant are obtained, i.e. glass is formed at grain boundaries in sintering the ceramic composition, and the baking temperature for obtaining a dense sintered body can be decreased to promote sintering. When the content of AO relative to 100 parts by mole of $BaTiO_3$ is expressed as $x_4$, $x_4$ is in the range of $0.5 \leq x_4 \leq 6.0$. When the content of $MO_2$ relative to 100 parts by mole of $BaTiO_3$ is expressed as $x_5$, $x_5$ is in the range of $0.5 \leq x_5 \leq 6.0$. When $x_4$ or $x_5$ is lower than 0.5, the effects as the sintering assistant cannot be obtained sufficiently. When $x_4$ or $x_5$ exceeds 6.0, a decrease in dielectric constant or an increase in temperature dependence of capacitance may be caused.

The dielectric ceramic composition of the present invention may contain $V_2O_5$ to further prolong the IR accelerated life. In this case, when the content of $V_2O_5$ relative to 100 parts by mole of $BaTiO_3$ is expressed as $x_6$, $x_6$ is in the range of $0.01 \leq x_6 \leq 1.0$. When $x_6$ is lower than 0.25, the effect of $V_2O_5$ to prolong the life cannot be obtained sufficiently. When $x_6$ exceeds 1.0, a decrease in dielectric constant or an increase in temperature dependence of capacitance may be caused.

The dielectric ceramic composition of the present invention may contain $Al_2O_3$ and/or $B_2O_3$ to further lower the baking temperature necessary for sintering the dielectric ceramic composition and to provide a dense sintered body. In this case, when the total content of $Al_2O_3$ and/or $B_2O_3$ relative to 100 parts by mole of $BaTiO_3$ is expressed as $x_7$, $x_7$ is in the range of $0.2 \leq x_7 \leq 1.0$. When $x_7$ is lower than 0.5, the effect of $Al_2O_3$ and/or $B_2O_3$ cannot be obtained sufficiently. When $x_7$ exceeds 1.0, an increase in temperature dependence of capacitance may be caused.

The dielectric ceramic composition of the present invention, when it undergoes the baking at temperatures below e.g. 135° C. in a reducing atmosphere or a low-oxygen atmosphere, exhibits high insulation resistance and high dielectric strength, a sufficient life in an accelerated test at high temperature and high voltage. Further, the change of capacitance relative to the temperature change is small.

For instance, the dielectric ceramic composition of the present invention can exhibit dielectric constant of 3000 or more at 1 kHz, capacitance resistance product (CR product) of 2000 Ω·F. or more at high voltage (5 V/μm), dielectric strength of 70 V/μm or more, capacitance reduction of 30% or less upon DC application of 3 V/μm, life of one hour or more before the insulation resistance decreases to $10^5$ Ω or less (IR accelerated life) upon the application of 30 V/μm at 200° C.

Further, in the dielectric ceramic composition according to the present invention, the temperature dependence of the capacitance can satisfy the condition of the X7R characteristics of EIA standard (i.e., the change of capacitance at −55 to 125° C. relative to the capacitance at the reference temperature of 25° C. is within ±15%), and further satisfy the condition of the B characteristics of JIS (i.e., the change of capacitance at −25 to 85° C. relative to the capacitance at the reference temperature of 20° C. is within ±10%).

The above properties could not be obtained in a prior-art dielectric ceramic composition for Ni inner electrodes and are equivalent or superior to the properties of the dielectric ceramic composition for Pd inner electrodes baked at high temperatures in an oxidizing atmosphere.

The multilayer ceramic capacitor 10 is manufactured as follows. First, $BaTiO_3$ powder which is the main component and oxides of Mn, Cr, Y, Ho, V and the like are weighed and mixed to provide a prescribed composition and pre-baked at 80 to 1200° C. for one to five hours. Subsequently, the pre-baked powder mixture is pulverized. To obtain excellent dielectric characteristics of the dielectric composition, it is preferable to perform the pulverization until the average particle size becomes 0.1 μm or less.

The components such as AO (BaO, CaO, SrO), $MO_2$ ($SiO_2$, $GeO_2$), $Al_2O_3$, $B_2O_3$, which are to become oxide glass, are heated to a high temperature for melting and then suddenly cooled and pulverized to produce oxide glass powder.

Subsequently, glass powder, an organic binder, a plasticizer, a solvent and a dispersant, for example, are added to and mixed with the pre-baked powder to prepare slurry. Then, by a doctor blade method, for example, a green sheet of a predetermined thickness is prepared from the slurry. Then, conductive paste including metal powder for forming inner electrodes is printed on the green sheet. A plurality of green sheets formed in this way and each having an obverse surface on which conductive paste is printed are laminated so that the conductive paste and the green sheet are alternately positioned, and then bonded under pressure. Subsequently, the laminated product is subjected to pretreatment heating for removing the binder, baking (baking step) at a high temperature of 1100 to 1350° C. for sintering and re-oxidation treatment at a high temperature in a predetermined oxidizing atmosphere. If the baking step is performed at a baking temperature above 1350° C., Ni or Ni alloy are likely to agglomerate and may be baked like an island. Therefore, the baking temperature up to 1350° C. is preferable.

Subsequently, a pair of outer electrodes 13 as connection terminals to an external circuit are formed at predetermined positions of the laminated body. The multilayer ceramic capacitor 10 can be manufactured in the above-described manner, for example.

EXAMPLES AND COMPARATIVE EXAMPLES

[Preparation of Multilayer Ceramic Capacitor]

A plurality of multilayer ceramic capacitors which were different from each other in composition of the dielectric layer between electrodes were prepared as capacitors of inventive examples 1-33 and those comparative examples 1-8. FIG. 2 shows the dielectric ceramic compositions (except for $BaTiO_3$) constituting the dielectric layer between electrodes in the capacitors of the inventive examples 1-21. FIG. 3 shows the dielectric ceramic compositions (except for $BaTiO_3$) constituting the dielectric layer between electrodes in the capacitors of the inventive examples 22-33 and the comparative examples 1-8. In FIGS. 2 and 3, the relative amount of substance of each oxide relative to 100 parts by mole of $BaTiO_3$ is described.

The capacitors of inventive examples 1-33 and comparative examples 1-8 were prepared as follows. First, $BaTiO_3$ powder (average particle size of 0.4 μm) obtained by oxalate coprecipitation, MnO powder, $Cr_2O_3$ powder, $V_2O_5$ powder, and $Y_2O_3$ powder and $Ho_2O_3$ powder if necessary, were weighed and mixed, and then pre-baked at 1100° C. for seven hours. Thereafter, the powder mixture was pulverized, whereby first oxide powder having an average particle size of up to 0.1 μm was obtained.

The appropriate one or ones of carbonates of Ba, Ca and Sr to obtain the function of a sintering assistant, and $SiO_2$ and/or $Ge_2O_3$, and $Al_2O_3$ and/or $B_2O_3$ to obtain the function of a sintering assistant were weighed and mixed, and then pre-baked at 1250° C. for two hours. Thereafter, the powder was pulverized, whereby second oxide powder having an average particle size of up to 0.1 μm was obtained.

By mixing the two kinds of oxide powders at a prescribed ratio, the material powder was obtained.

Next, 700 g of toluene-ethanol solvent containing a plasticizer and a dispersant was added to 1000 g of material powder, and a dispersing process using a ball mill was performed for two hours to prepare slurry having a viscosity of about 200 cps. Thereafter, the slurry was applied onto a PET film by using a lip-coater type applicator, whereby a green sheet having a thickness of 2.5 μm was prepared.

Subsequently, conductive paste containing Ni powder was printed on the green sheet to form an inner electrode pattern (thickness 1.5 μm). In this way, a plurality of green sheets each formed with an inner electrode pattern thereon were prepared. After the PET film as the base member was peeled off from each of the green sheets, the green sheets were so laminated that the inner electrode pattern and the green sheet are alternately positioned (effective lamination number: 350) and heated for bonding under pressure.

Then, the laminated body was cut into a predetermined size to provide green chips. Thereafter, the green chips were subjected to de-binder treatment, i.e. heated at 400° C. for twelve hours in nitrogen gas. Subsequently, the green chips were subjected to a baking process (sintering process), i.e. heated at 1100 to 1350° C. for four hours in a mixed gas of humidified nitrogen and hydrogen. In the baking-process, the ceramic composition in each of the green sheets was sintered to form a dielectric layer, and Ni powder in the conductive paste was sintered to form an inner electrode. The baking temperature had been determined in advance with respect to each kind of green chip and green sheet. Specifically, samples having the same structure as the green chips had been prepared and baked at different baking temperatures to find the lowest baking temperature which could provide dense sintered bodies.

Then, the sintered laminated body, having undergone the baking process, was subjected to annealing by heating at 1000° C. in humidified nitrogen for three hours.

Subsequently, after a predetermined end surface of the sintered laminated body was polished, conductive paste containing Cu powder was applied to the polished surface. Then, by heating at 850° C. in a nitrogen atmosphere for two hours, the conductive paste was formed into an outer electrode. In this way, the capacitors of inventive examples 1-33 and those of comparative examples 1-8 were prepared. Each of the capacitors had a length of 3.1 mm, a width of 1.6 mm and a thickness of 1.6 mm. In each capacitor, the effective dielectric layer had a thickness of 2.0 μm, and the inner electrode had a thickness of 1.2 μm.

[Performance Examination]

The capacitors of inventive examples 1-33 and those of comparative examples 1-8 were examined for the dielectric constant, the dielectric loss (tan δ), the CR product, the dielectric strength, the temperature dependence of capacitance, the DC-Bias characteristics and the IR accelerated life. The examination results are given in the tables of FIGS. 4 and 5.

The dielectric constant and the dielectric loss (tan δ) were obtained from the capacitance at 20° C., the electrode area and the thickness of the dielectric under the conditions of 1 V and 1.0 kHz.

To obtain the CR product, the one minute value of insulation resistance when 5V was applied per 1 μm thickness of dielectric at 25° C. was measured. The measured value was multiplied by the capacitance to obtain the CR product. The CR value serves as an indicator of the level of the insulation resistance, and hence, serves as an indicator of the reduction resistance.

As to the dielectric strength, the voltage applied to the capacitors was continuously increased, and the voltage at which the current of 10 mA or more flowed was measured using fifty sample capacitors for each composition. The intermediate value of the fifty measured values of each capacitor is described in the table as the representative value.

As to the temperature dependence of the capacitance, whether the capacitors satisfied the conditions of X7R characteristics of EIA standard and "B" characteristics of JIS was examined. As to the X7R characteristics of EIA standard, the capacitance at a measurement voltage of 1V was measured at a plurality of points in the temperature range of −55 to 125° C. by using an LCR meter, and determination was made as to whether or not the change of capacitance relative to the capacitance at the reference temperature of 25° C. was within ±15%. As to the "B" characteristics of JIS, the capacitance at a measurement voltage of 1V was measured at a plurality of points in the temperature range of −25 to 85° C. by using an LCR meter, and determination was made as to whether or not the change of capacitance relative to the capacitance at the reference temperature of 20° C. was within ±10%. The mark "○" is applied to the capacitors which satisfied the above conditions, whereas the mark "x" is applied to the capacitors which did not satisfy the above conditions.

As to the DC-Bias characteristics, the capacitance when DC voltage of 6V and AC voltage of 1 Vrms and 1.0 kHz were applied in a superposing manner was measured, and the decreasing ratio of the capacitance relative to the capacitance when AC voltage of 1 Vrms and 1.0 kHz was applied was obtained. The DC-Bias characteristics serves as an indicator of deterioration with time of the insulation resistance.

As to the IR accelerated life, DC voltage of 60 V (30 V/μm) was applied at 200° C., and the time period before the insulation resistance decreases to $10_5 \Omega$ or less was measured as the IR lifetime. The IR accelerated life serves as an indicator of reliability.

[Evaluation]

As will be understood from the examination results given in the tables of FIGS. 4 and 5, the dielectric ceramic composition of the present invention, which contains $BaTiO_3$, an appropriate amount of MnO and $Cr_2O_3$ added thereto, $Y_2O_3$ and/or $Ho_2O_3$ further added thereto and glass formation comprising BaO, CaO, SrO or the like and $SiO_2$, $GeO_2$ or the like, does not deteriorate the properties as the dielectric, is suitable for the use of Ni or the like for the electrode and becomes a dense sintered body at a baking temperature of 1150 to 1350° C. Even after the baking step in a reducing temperature in the manufacturing process, the capacitors made by using the dielectric ceramic composition of the invention exhibit dielectric constant higher than 3000, CR product higher than 2000, dielectric strength higher than 80V/μm, low temperature dependence of capacitance, and IR accelerated life of no less than 1.5 hour which indicates high reliability.

However, in a composition departing from the composition range of the present invention, i.e., in the capacitor of the comparative example 1 in which the MnO content is too low, for example, the CR product is low and the insulation resistance is insufficient. The capacitor of the comparative example 3 in which the $Cr_2O_3$ content is too low and the capacitor of the comparative example 5 in which the total content of $Y_2O_3$ and $Ho_2O_3$ is too low have a problem with the temperature dependence of capacitance. The capacitor of the comparative example 8 in which the BaO content and the $SiO_2$ content are too high has a short IR accelerated life and hence has low reliability. Further, proper performance examination could not be performed with respect to the capacitor of the comparative example 2 in which the MnO content was too high, the capacitor of the comparative example 4 in which the $Cr_2O_3$ content was too high, the capacitor of the comparative example 6 in which the $Y_2O_3$ content was too high, and the capacitor of the comparative example 7 in which the BaO content and the $SiO_2$ content were too low, because the compositions could not be sintered properly at temperatures up to 1350° C.

The invention claimed is:

1. A dielectric ceramic composition comprising 100 parts by mole of $BaTiO_3$, $x_1$ parts by mole of MnO, $x_2$ parts by mole of $Cr_2O_3$, $x_3$ parts by mole of $Y_2O_3$ and/or $Ho_2O_3$, $x_4$ parts by mole of oxide selected from the group consisting of BaO, CaO and SrO, and $x_5$ parts by mole of $SiO_2$ and/or $GeO_2$, wherein $0.5 \leq x_1 \leq 4.5$, $0.05 \leq x_2 \leq 1.0$, $x_1+x_2 \leq 4.55$, $0.25 \leq x_3 \leq 1.5$, $0.5 \leq x_4 \leq 6$ and $0.5 \leq x_5 \leq 6$.

2. The dielectric ceramic composition according to claim 1, further comprising 0.01 to 1.0 part by mole of $V_2O_5$.

3. The dielectric ceramic composition according to claim 1, further comprising 0.2 to 1.0 part by mole of $Al_2O_3$ and/or $B_2O_3$.

4. The dielectric ceramic composition according to claim 2, further comprising 0.2 to 1.0 part by mole of $Al_2O_3$ and/or $B_2O_3$.

5. A multilayer ceramic capacitor comprising a laminated structure of a ceramic dielectric and an electrode;
wherein the ceramic dielectric is made of a dielectric ceramic composition as set forth in claim 1; and
wherein the electrode is made of Ni or an alloy containing Ni.

6. An electronic component including a portion made of the dielectric ceramic composition as set forth in claim 1.

* * * * *